(12) United States Patent
Ogata (10) Patent No.: US 8,199,627 B2
(45) Date of Patent: Jun. 12, 2012

(54) MULTI-LAYER DATA STORAGE MEDIUM HAVING ECCENTRIC RECORDING LAYERS AND RECORDING LAYER IDENTIFICATION METHOD BASED ON ECCENTRICITY

(75) Inventor: Tetsuya Ogata, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 373 days.

(21) Appl. No.: 12/277,885

(22) Filed: Nov. 25, 2008

(65) Prior Publication Data

US 2009/0147643 A1     Jun. 11, 2009

(30) Foreign Application Priority Data

Dec. 5, 2007  (JP) ................................ 2007-314961

(51) Int. Cl.
    *G11B 7/00* (2006.01)
(52) U.S. Cl. ......................................................... 369/94
(58) Field of Classification Search .................. 369/278, 369/282
    See application file for complete search history.

(56) References Cited

U.S. PATENT DOCUMENTS

| | | | |
|---|---|---|---|
| 4,060,546 A | | 11/1977 | Blaser et al. |
| 5,524,002 A | * | 6/1996 | Morita et al. .................. 720/614 |
| 5,610,900 A | * | 3/1997 | Yamashita et al. ............. 720/705 |
| 5,748,575 A | * | 5/1998 | Lee ............................... 369/30.88 |
| 7,366,079 B2 | | 4/2008 | Ogata |
| 2002/0048242 A1 | * | 4/2002 | Yamamoto .................. 369/47.51 |
| 2003/0214898 A1 | | 11/2003 | Ogata et al. |
| 2004/0156294 A1 | * | 8/2004 | Watanabe et al. ................ 369/94 |
| 2004/0213109 A1 | | 10/2004 | Ogata et al. |
| 2005/0122879 A1 | | 6/2005 | Hirai et al. |
| 2005/0174918 A1 | | 8/2005 | Ogata |
| 2005/0201248 A1 | | 9/2005 | Kitabayashi et al. |
| 2005/0213480 A1 | * | 9/2005 | Yamaoka et al. ........... 369/275.3 |
| 2006/0209660 A1 | | 9/2006 | Ogata |
| 2006/0227679 A1 | | 10/2006 | Ogata et al. |
| 2006/0239143 A1 | * | 10/2006 | Yamamoto et al. ......... 369/47.17 |
| 2007/0097818 A1 | | 5/2007 | Madate et al. |
| 2007/0104072 A1 | | 5/2007 | Ogata |
| 2007/0230308 A1 | | 10/2007 | Ogata et al. |
| 2008/0130444 A1 | * | 6/2008 | Kikukawa et al. ........... 369/53.15 |
| 2008/0239891 A1 | | 10/2008 | Ogata |
| 2008/0247298 A1 | | 10/2008 | Ogata |
| 2008/0285396 A1 | * | 11/2008 | Salomon et al. ........... 369/44.26 |

FOREIGN PATENT DOCUMENTS

| | | | |
|---|---|---|---|
| JP | 10011766 A | * | 1/1998 |
| JP | 10198972 A | * | 7/1998 |
| JP | 2002-117591 | | 4/2002 |
| JP | 2002-334448 | | 11/2002 |
| JP | 2006-309860 | | 11/2006 |
| JP | 2007-95173 | | 4/2007 |
| JP | 2007-122813 | | 5/2007 |

OTHER PUBLICATIONS

Office Action, App. No. JP 2007-314961, dated Jul. 19, 2011.

* cited by examiner

*Primary Examiner* — Peter Vincent Agustin
*Assistant Examiner* — Mark Fischer
(74) *Attorney, Agent, or Firm* — Dickstein Shapiro LLP (57) ABSTRACT

A multi-layer data storage medium includes a plurality of recording layers in which a guide groove, where data is stored, is formed in a spiral manner, and each center of the plurality of recording layers is eccentric to a center of the multi-layer data storage medium in a different direction. A method of identifying a recording layer of the multi-layer data storage medium is also described.

5 Claims, 9 Drawing Sheets

MULTI-LAYER DATA STORAGE MEDIUM HAVING ECCENTRIC RECORDING LAYERS AND RECORDING LAYER IDENTIFICATION METHOD BASED ON ECCENTRICITY

CROSS-REFERENCE TO RELATED APPLICATIONS

The present application is based on and claims priority from Japanese patent application number 2007-314961, filed Dec. 5, 2007, the disclosure of which is hereby incorporated by reference herein in its entirety.

BACKGROUND

The present invention relates to a multi-layer data storage medium, for example, an optical disk and so on, and a recording layer identification method of identifying a recording layer of the multi-layer data storage medium.

In a case where data is stored in a recording layer of a multi-layer data storage medium, and in a case where data in a recording layer of a multi-layer data storage medium is reproduced or deleted, after recognizing a recording layer on which light is condensed at that time, scanning of an objective recording layer by an object lens and identifying the recording layer on which scanning is performed, recording, reproducing and deleting operations are performed.

In order to identify the recording layer on which scanning is performed, methods of obtaining data of the recording layer information from a wobble signal and from a difference of a reproducing signal amplitude, by traditionally using a difference of a spiral of a guide groove, are known.

Japanese patent publication number 2002-117591 discloses a method of confirming a position of a recording layer by using differences of a depth, a width, an amplitude and a cycle of a spiral, of a guide groove.

Japanese patent publication number 2006-309860 discloses a method of confirming the position of the recording layer by using a difference of an amplitude of a reproducing signal.

Japanese patent publication number 2002-334448 (now patented as U.S. Pat. No. 4,060,546) discloses a method of identifying recording layer information by shifting a starting position of pre-format information in a rotating direction per recording layer.

However, in these methods above, it is necessary that spot light should be focus-controlled and additionally should be track-controlled to a guide groove, therefore there is a time loss. If it is possible to identify a recording layer which is scanned without a tracking control of the recording layer information, high-speed access to the recording layer is achieved.

A main object of the present invention is to obtain identifying information without a tracking control and to achieve high-speed access to a recording layer.

SUMMARY

A multi-layer data storage medium according to an embodiment of the present invention comprises: a plurality of recording layers in which a guide groove, where data is stored, is formed in a spiral manner, and each center of the plurality of the recording layers is eccentric to a center of the multi-layer data storage medium in a different direction.

Preferably, a figure formed by connecting each center of the plurality of the recording layers has a rotational symmetry centering on the center of the multi-layer data storage medium.

Preferably, reference direction information is recorded along a radius direction in an arbitrary recording layer of the plurality of the recording layers.

Preferably, reference direction information is recorded along a radius direction in all recording layers of the plurality of the recording layers.

A multi-layer data storage medium according to an embodiment of the present invention comprises: a plurality of recording layers in which a guide groove, where data is stored, is formed in a spiral manner, and each center of the plurality of the recording layers is eccentric to the center of the multi-layer data storage medium, each eccentricity angle is measured beforehand, and the measured result and identifying information of the recording layer corresponding to the eccentricity are recorded in a burst cutting area of an arbitrary recording layer of the plurality of the recording layers.

A recording layer identifying method according to an embodiment of the present invention, which identifies a recording layer on which spot light is focused, in a case where a multi-layer data storage medium including a plurality of recording layers each having a guide groove formed in a spiral manner where data is stored and a center which is respectively eccentric to a different direction to a center of the multi-layer data storage medium stores or reproduces data, comprises: calculating an eccentricity angle of each recording layer based on a tracking error signal of each recording layer obtained by being synchronized with a rotation timing of a spindle motor which rotates the multi-layer data storage medium; and identifying the recording layer by use of the eccentricity angle.

Preferably, the eccentricity angle is calculated based on a tracking error signal of an arbitrary recording layer of the plurality of the recording layers.

Preferably, in a case where the eccentricity angle is calculated, reference direction information recorded along a radius direction in at least one recording layer is used.

Preferably, a recording layer is identified based on the calculated eccentricity angle, and the eccentricity angle and identifying information of the recording layer recorded in a burst cutting area provided in the arbitrary recording layer.

DETAILED DESCRIPTION OF THE PREFERRED EMBODIMENTS

Hereinafter, referring to the drawings of embodiments of the present invention will be explained. Firstly, based on FIG. 1, a first embodiment (a multi-layer data storage medium) will be explained.

Figure 1:
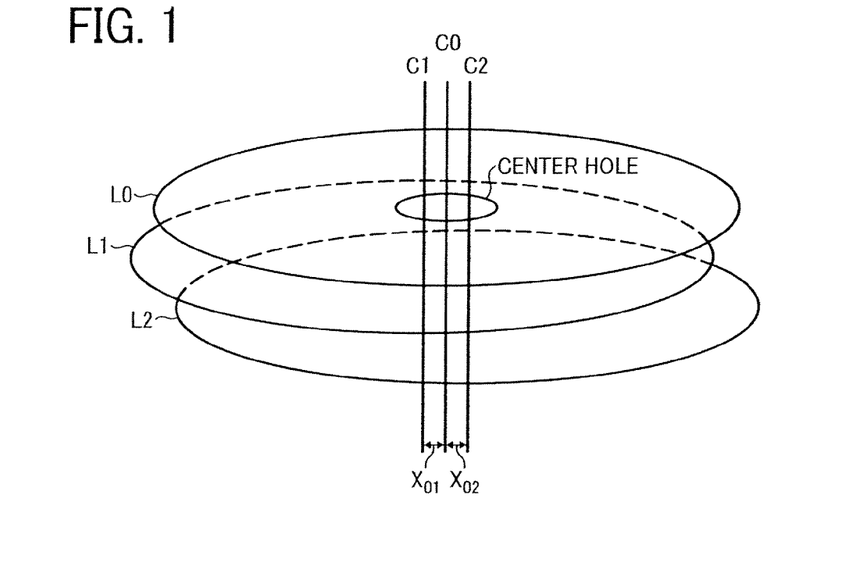
FIG. 1 is an explanatory diagram which illustrates differences of eccentricities of a multi-layer data storage medium according to a first embodiment of the present invention.

In FIG. 1, a structural example of a multi-layer data storage medium according to the first embodiment is illustrated. This multi-layer data storage medium comprises a first layer, L0, a second layer, L1 and a third layer, L2. In this multi-layer data storage medium, a center hole is open centering on a position, which is shifted by $X_{00}$ from a center, C0 of an L0 layer, as a center of rotation.

An L1 layer is laminated where a center, C1 is shifted by only $X_{01}$ in the −X direction to the center C0 of the L0 layer. Additionally, an L2 layer is laminated where a center, C2 is shifted by only $X_{02}$ in the +X direction to the center C0 of the L0 layer. Therefore, when this multi-layer data storage medium rotates centering on the center hole, the L0 layer has a small eccentricity, an eccentricity of $X_{01}-X_{00}$ occurs in the L1 layer and an eccentricity of $X_{02}+X_{00}$ occurs in the L2 layer.

Therefore, identifying information of recording layers of this multi-layer data storage medium is described such that the eccentricity of the L0 layer is small, the eccentricity of the L1 layer is the −X direction, and the eccentricity of the L2 layer is the +X direction.

Based on FIG. 6, the second embodiment (a recording layer identifying method) will be explained.

Figure 6:
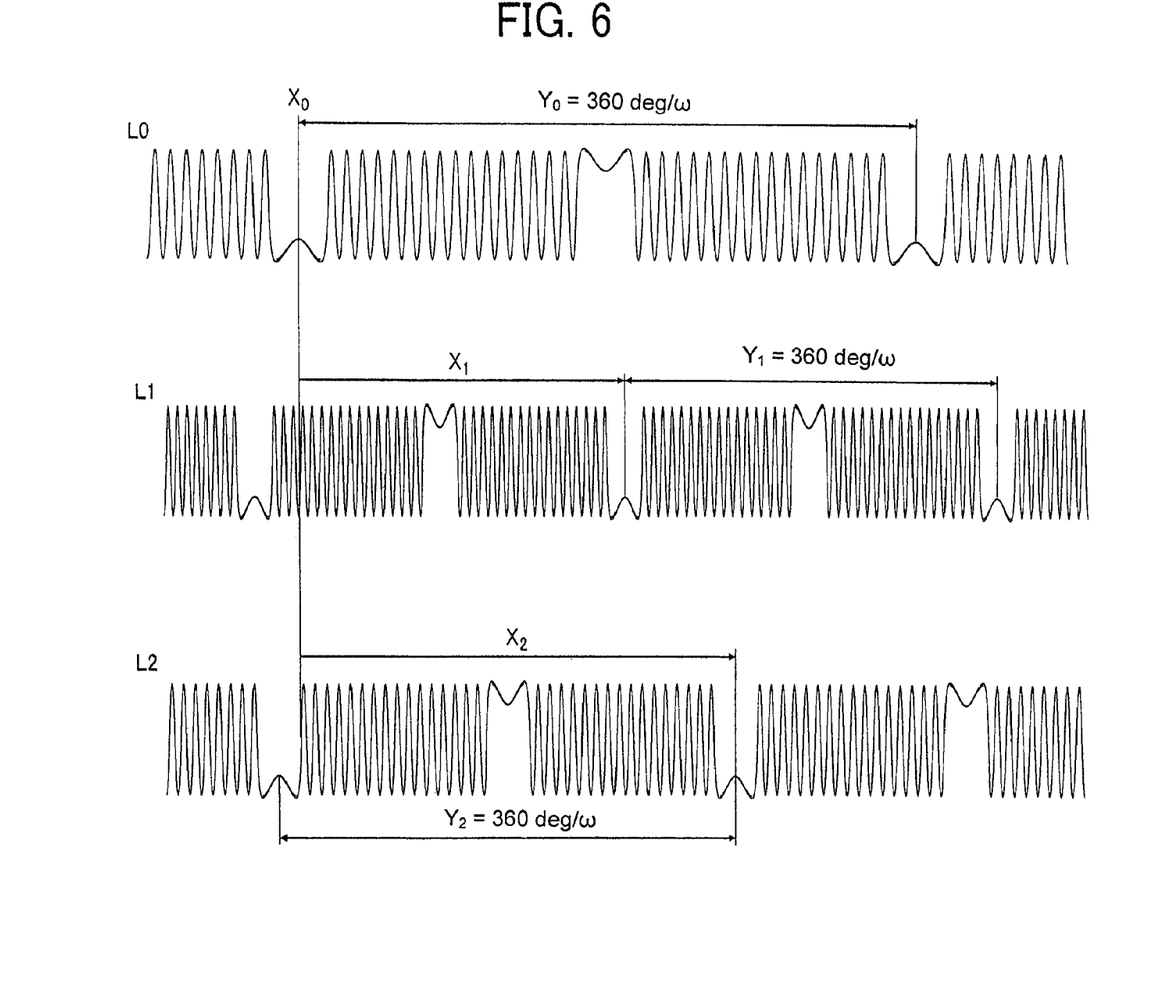
FIG. 6 is an explanatory diagram which illustrates a recording layer identifying method of identifying an eccentricity direction from a tracking error signal according to a second embodiment of the present invention.

FIG. 6 illustrates a tracking error signal (a push-pull signal) which occurs when spot light is focused on each recording layer L0, L1 and L2 of the multi-layer data storage medium of FIG. 1.

When the multi-layer data storage medium rotates, the tracking error signal inverts twice per one rotation. That is, when the tracking error signal inverts twice, the multi-layer data storage medium rotates once, that is, rotates 360 degrees.

Therefore, as for the tracking error signal of the L0 layer, $Y_0$ is equivalent to 360 degrees/ω, as for the tracking error signal of the L1 layer, $Y_1$ is equivalent to 360 degrees/ω, and as for the tracking error signal of the L2 layer, $Y_2$ is equivalent to 360 degrees/ω, where ω is an angular velocity of the spindle motor.

A number n0 of the tracking error signal in $Y_0$ is calculated by $n0=2P/X_{00}$, when an eccentricity of the L0 layer is taken as $X_{00}$, and a track pitch is taken as P. In the multi-layer data storage medium of FIG. 1, since the center C0 of the L0 layer is set to be in the vicinity of the center of the center hole, the eccentricity is small, and there are few tracking error signals per unit time. However, eccentricities of the L1 layer and the L2 layer are larger, compared with that of the L0 layer, and there are a larger number of tracking error signals per unit time.

Here, a timing where the tracking error signal of the L0 layer is detected is taken as $X_0$. When a spindle motor, which rotates the multi-layer data storage medium, rotates once, a tracking error signal which has the same phase as the tracking error signal detected at the timing $X_0$ is detected again. This timing $X_0$ is taken as a reference, and when looking at the tracking error signal of the L1 layer, the timing where a first tracking error signal inverts after the timing $X_0$ in the L1 layer is shifted by only $X_1$.

In the L1 layer, $Y_1$ is equivalent to 360 degrees/ω, therefore an eccentricity angle θ1 of the L1 layer to the L0 layer is shifted by $\theta1=360 \times (X_1/Y_1)$ degrees. Therefore, it is possible to calculate the eccentricity angle θ1 of the L1 layer to the L0 layer by use of the timing where the tracking error signal inverts.

Likewise, when looking at the tracking error signal of the L2 layer, the timing where a first tracking error signal inverts after the timing $X_0$ in the L2 layer is shifted by only $X_2$. In the L2 layer, $Y_2$ is equivalent to 360 degrees/ω, therefore an eccentricity angle θ2 of the L2 layer to the L0 layer is shifted by $\theta2=360 \times (X_2/Y_2)$ degrees. Therefore, it is possible to calculate the eccentricity angle θ2 of the L2 layer to the L0 layer by use of the timing where the tracking error signal inverts.

Thus, it is possible to identify each recording layer based on the eccentricity angle calculated from the tracking error signal by use of the multi-layer data storage medium of the present invention.

Therefore, even without performing a tracking operation of an object lens on a guide groove of each recording layer, it is possible to identify the recording layer on which spot light is focused at the present time, and thereby high-speed access to the recording layer is achieved.

In the present embodiment, an occurrence timing of the tracking error signal of the L0 layer is taken as a reference, however it is not always necessary that the occurrence timing of the tracking error signal should be that of the L0 layer. In order to carry out the present invention, it is preferable that an occurrence timing of a tracking signal of a recording layer which is the easiest to read by an optical pick-up device be taken as the reference.

Figure 2:
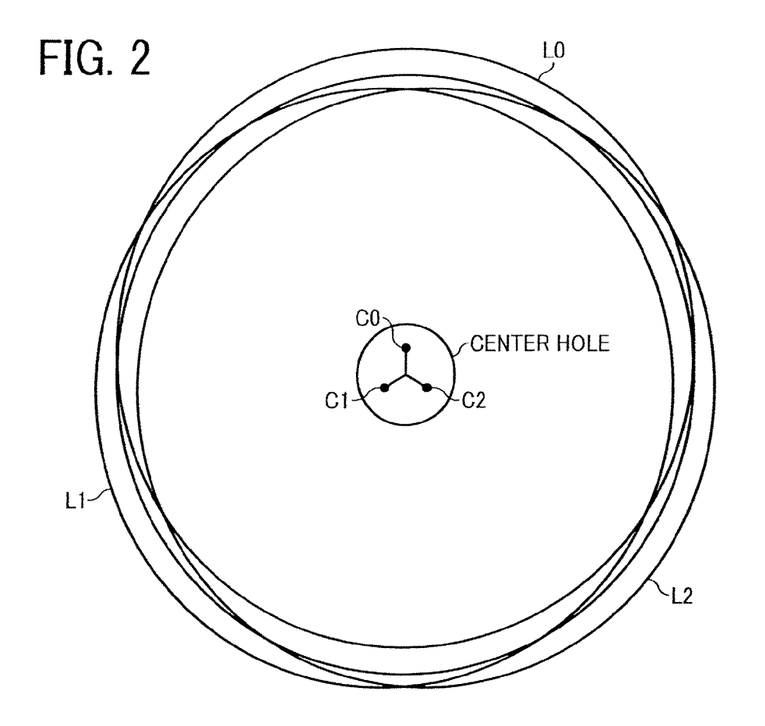
FIG. 2 is an explanatory diagram which illustrates a multi-layer data storage medium according to a third embodiment of the present invention in which centers of each recording layer have a rotational symmetry relationship.

Based on FIG. 2, a third embodiment (a multi-layer data storage medium) will be explained.

A characteristic of this embodiment is that an eccentricity amount of each recording layer of the multi-layer data storage medium is minimized to as small as possible.

As for this multi-layer data storage medium, each recording layer is laminated so that the center C0 of the L0 layer, the center C1 of the L1 layer, and the center C2 of the L2 layer have rotational symmetries to the center of the center hole.

And this makes it possible to change the eccentricity direction of each recording layer in a state where the eccentricity amount of the L0, L1 and L2 layers is minimized to as small as possible.

Here, the center hole of the multi-layer data storage medium may be provided centering on a point which is in a position having an equal distance from center positions C0, C1 and C2 of each recording layer, after laminating each recording layer.

Based on FIG. 3, a fourth embodiment (a multi-layer data storage medium) will be explained.

A characteristic of the multi-layer data storage medium according to this embodiment is that a reference direction in order to identify the eccentricity direction of each recording layer is recorded as reference direction information (preformat information) beforehand.

This reference direction information is recorded along a radius direction in an arbitrary recording layer of the multi-layer data storage medium. Identifying information of each recording layer can be obtained by calculating an eccentricity angle of each recording layer to this reference direction.

Based on FIG. 7, a fifth embodiment (a recording layer identifying method) will be explained.

Figure 3:
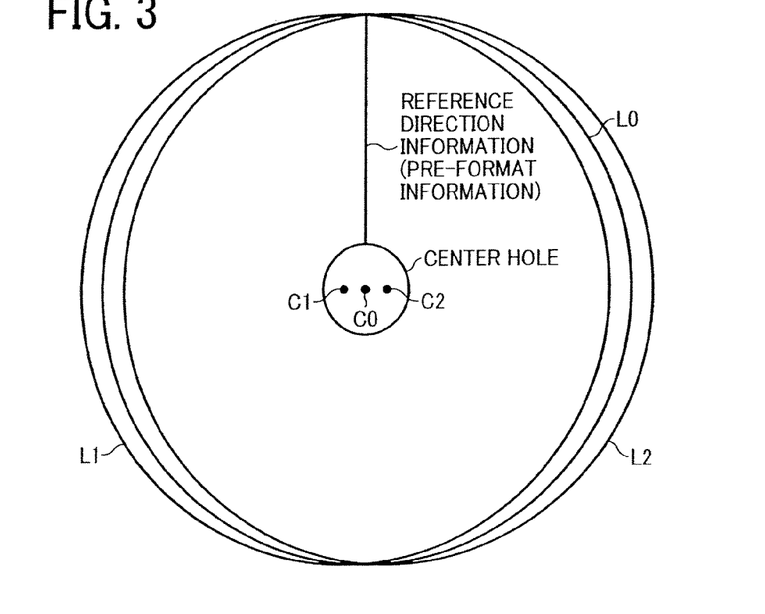
FIG. 3 is an explanatory diagram which illustrates reference direction information (pre-format information) which is recorded in an arbitrary recording layer of a multi-layer data storage medium according to a fourth embodiment of the present invention.
Figure 7:
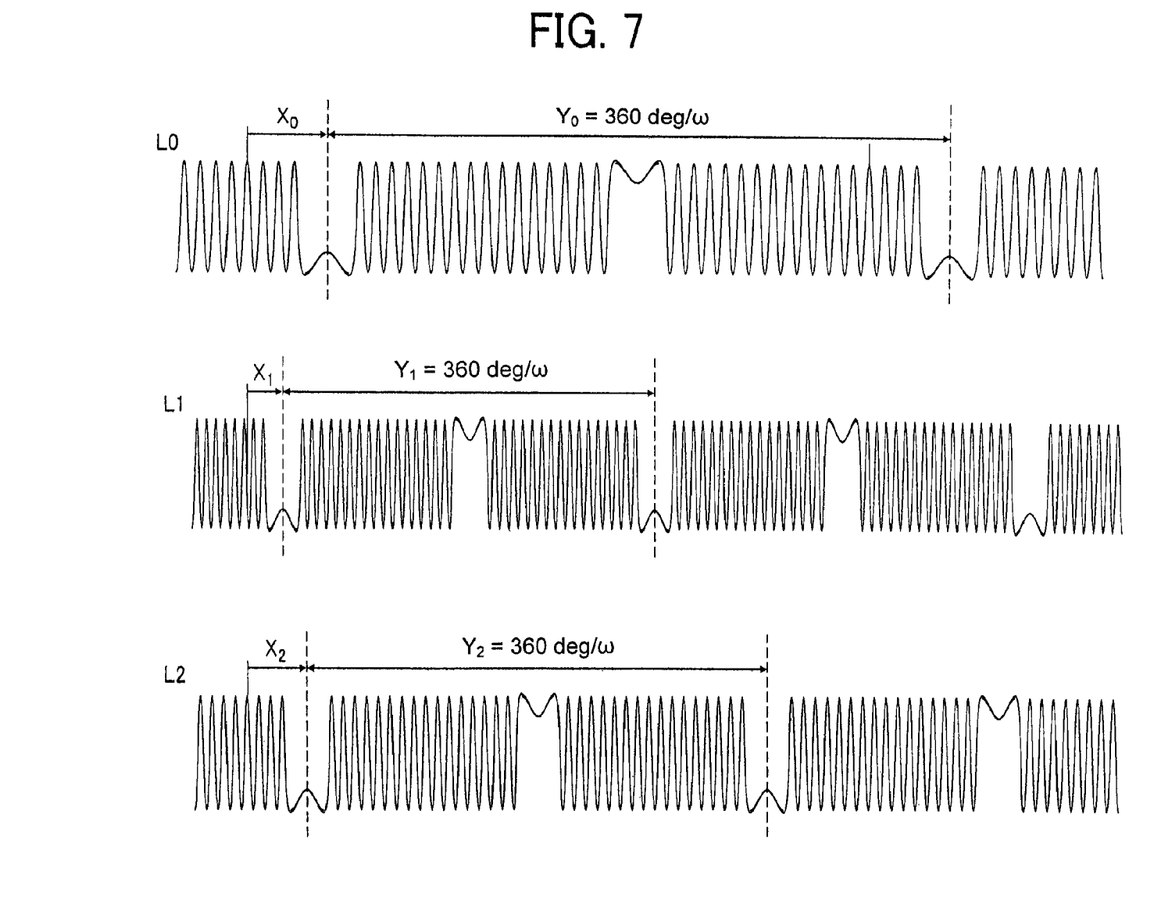
FIG. 7 is an explanatory diagram which illustrates a recording layer identifying method of identifying an eccentricity direction from a tracking error signal according to a fifth embodiment of the present invention.

FIG. 7 illustrates a tracking error signal (a push-pull signal) which occurs when spot light is focused on each recording layer L0, L1 and L2 of the multi-layer data storage medium of FIG. 3.

When the multi-layer data storage medium rotates, the tracking error signal inverts twice per one rotation. That is, when the tracking error signal inverts twice, the multi-layer data storage medium rotates once, that is, rotates 360 degrees.

Therefore, as for the tracking error signal of the L0 layer, $Y_0$ is equivalent to 360 degrees/ω, as for the tracking error signal of the L1 layer, $Y_2$ is equivalent to 360 degrees/ω, and as for the tracking error signal of the L2 layer, $Y_2$ is equivalent to 360 degrees/ω, where ω is an angular velocity of the spindle motor.

Here, for example, reference direction information (preformat information) is recorded in the L0 layer. In a case where the tracking error signal of the L0 layer is reproduced, when spot light crosses the reference direction information, a pulse waveform is detected. The pulse waveform is detected again, when a spindle motor 22, which rotates the multi-layer data storage medium, rotates once.

Figure 10:
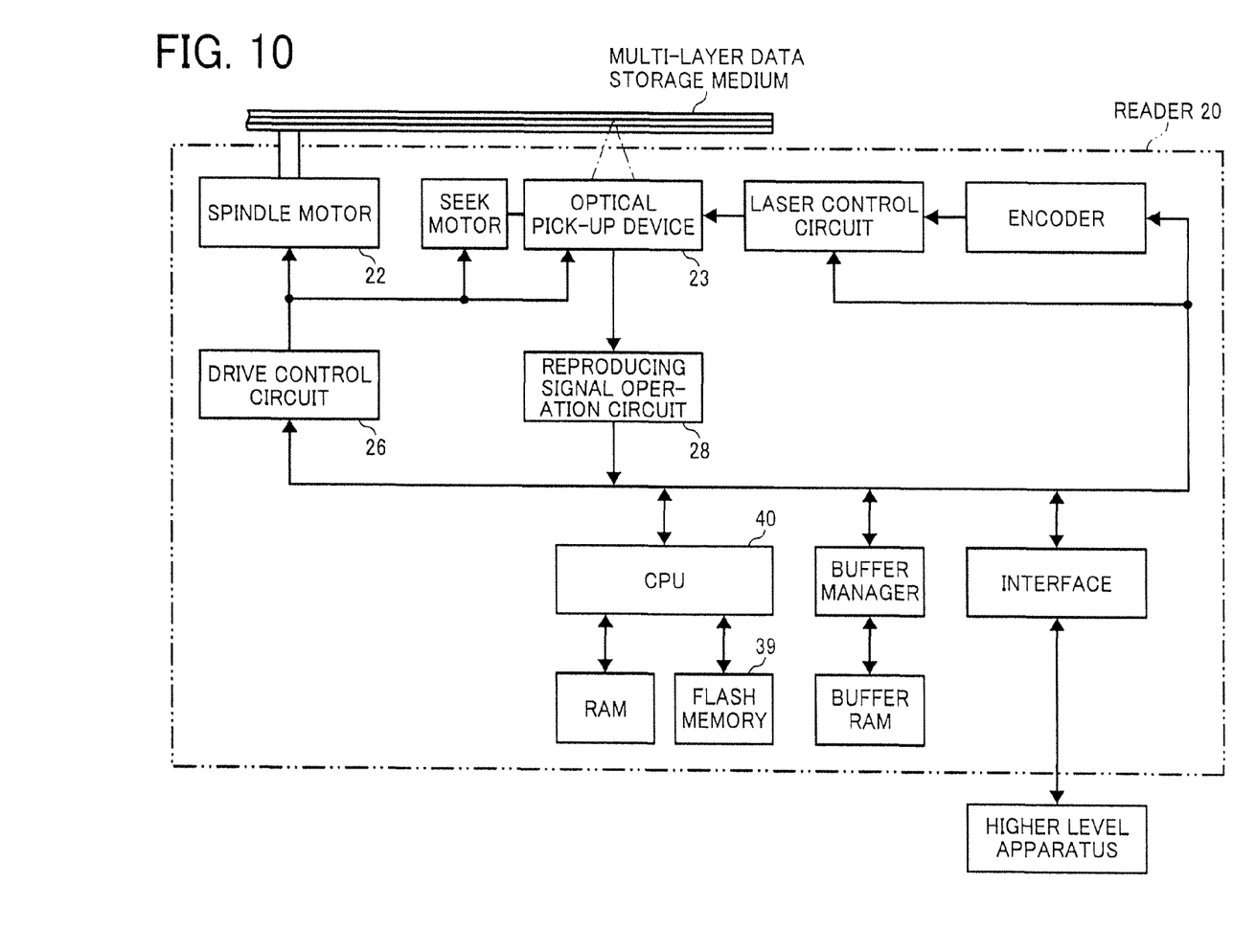
FIG. 10 is a diagram which illustrates a reproduction apparatus which identifies an eccentricity direction of a multi-layer storage medium.

FIG. 10 illustrates a reader 20 to read out the multi-layer data storage medium. The pulse waveform is output from an optical pick-up device 23, is synchronized with a signal of a drive control circuit 26, which rotates the spindle motor 22, and is recorded in a flash memory 39 via a reproducing signal operation circuit 28 and a CPU 40.

That is, the reference direction information is synchronized with the signal of the drive control circuit 26 of the spindle motor 22 and is constantly recognized.

Based on FIG. 7, the L0 layer will be explained. In the L0 layer, a detected timing of a first tracking error signal after the pulse waveform is shifted by $X_0$ to a detected timing of the pulse signal. In the L0 layer, $Y_0$ is equivalent to 360 degrees/ω, therefore an eccentricity angle θ0 of the L0 layer is shifted by θ0=360×($X_0/Y_0$) degrees to the reference direction. Therefore, the eccentricity angle θ0 of the L0 layer to the reference direction is calculated based on the pulse waveform and the tracking error signal.

When looking at the tracking signal of the L1 layer, in the L1 layer, a detected timing of a first tracking error signal after the pulse waveform is shifted by $X_1$ to a detected timing of the pulse signal. In the L1 layer, $Y_1$ is equivalent to 360 degrees/ω, therefore an eccentricity angle θ1 of the L1 layer is shifted by θ1=360×($X_1/Y_1$) degrees to the reference direction. Therefore, the eccentricity angle θ1 of the L1 layer to the reference direction is calculated based on the pulse waveform and the tracking error signal.

When looked at the tracking error signal of the L2 layer, in the L2 layer, a detected timing of a first tracking error signal after the pulse waveform is shifted by $X_2$ to a detected timing of the pulse signal. In the L2 layer, $Y_2$ is equivalent to 360 degrees/ω, therefore an eccentricity angle θ2 of the L2 layer is shifted by θ2=360×($X_2/Y_2$) degrees to the reference direction. Therefore, the eccentricity angle θ2 of the L2 layer to the reference direction is calculated based on the pulse waveform and the tracking error signal.

Thus, by use of the multi-layer data storage medium of the present invention, it is possible to identify each recording layer based on the eccentricity angle calculated from the tracking error signal and the pulse waveform. Therefore, even without performing a tracking operation of an object lens on a guide groove of each recording layer, it is possible to identify the recording layer on which spot light is currently focused, and thereby high-speed access to a recording layer is achieved.

In the present embodiment, an example where the reference direction information is recorded in the L0 layer has been explained, however it is not always necessary that the recording layer of the reference direction information should be recorded in the L0 layer. In order to carry out the present invention, it is preferable that a recording layer which is the easiest to read by an optical pick-up device be taken as the reference direction information.

Based on FIG. 4, a sixth embodiment (a multi-layer data storage medium) will be explained.

A characteristic of the multi-layer data storage medium according to this embodiment is that a reference direction to identify an eccentricity direction of each recording layer is recorded as reference direction information.

This reference direction information is recorded along a radius direction in the same direction in each recording layer of the multi-layer data storage medium. Identifying information of each recording layer is obtained by calculating an eccentricity angle of each recording layer to this reference direction.

Based on FIG. 8, a seventh embodiment (a recording layer identifying method) will be explained.

Figure 4:
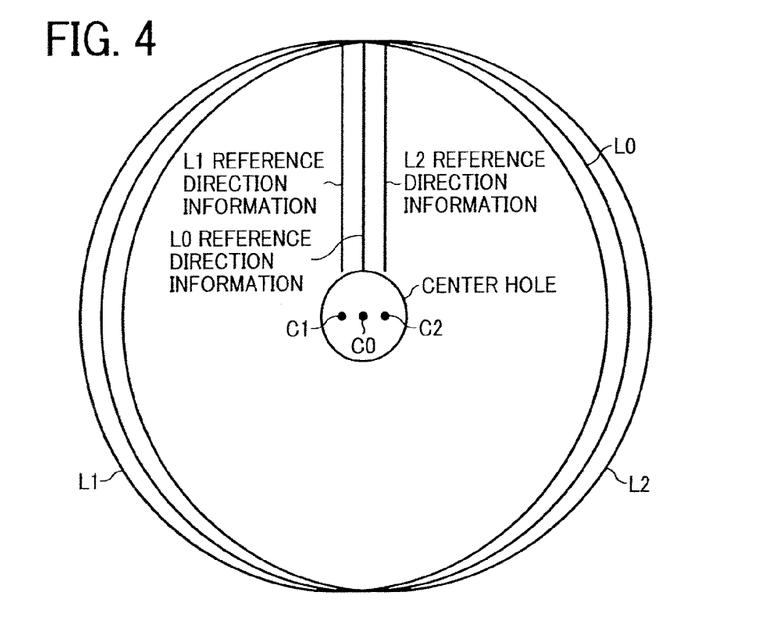
FIG. 4 is an explanatory diagram which illustrates reference direction information which are recorded in each recording layer of a multi-layer data storage medium according to a sixth embodiment of the present invention.
Figure 8:
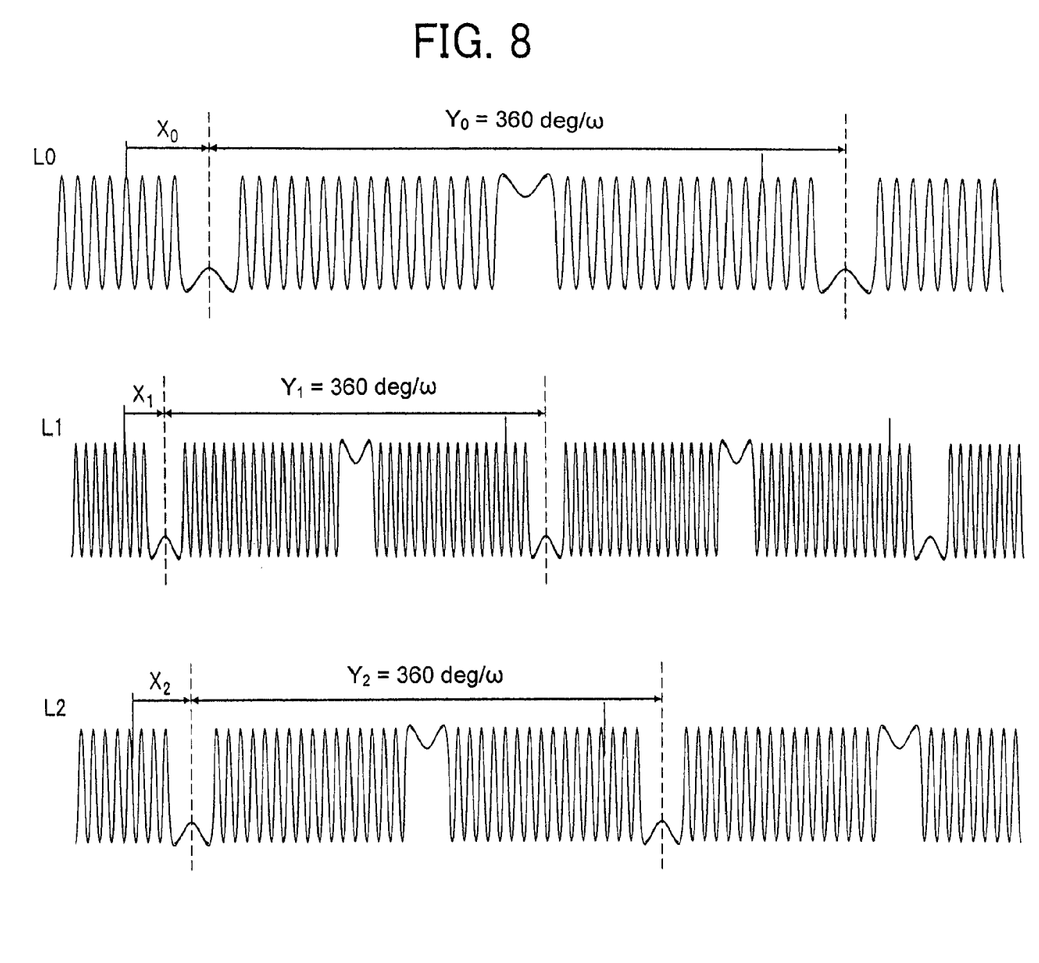
FIG. 8 is an explanatory diagram which illustrates a recording layer identifying method of identifying an eccentricity direction from a tracking error signal according to a seventh embodiment of the present invention.

FIG. 8 illustrates a tracking error signal (a push-pull signal) which occurs when spot light is focused on each recording layer L0, L1 and L2 of the multi-layer data storage medium of FIG. 4.

When the multi-layer data storage medium rotates, the tracking error signal inverts twice per one rotation. That is, the tracking error signal inverts twice, the multi-layer data storage medium rotates once, that is, rotates 360 degrees. Therefore, as for the tracking error signal of the L0 layer, $Y_0$ is equivalent to 360 degrees/ω, as for the tracking error signal of the L1 layer, $Y_1$ is equivalent to 360 degrees/ω and as for the tracking error signal of the L2 layer, $Y_2$ is equivalent to 360 degrees/ω, where ω is an angular velocity of the spindle motor.

Here, reference direction information is recorded in each recording layer.

Next, the L0 layer will be explained. In the L0 layer, a detected timing of a first tracking error signal after a pulse waveform is shifted by $X_0$ to a detected timing of the pulse waveform. In the L0 layer, $Y_0$ is equivalent to 360 degrees/ω, therefore an eccentricity angle θ0 of the L0 layer is shifted by θ0=360×($X_0/Y_0$) degrees to the reference direction. Therefore, the eccentricity angle θ0 of the L0 layer to the reference direction is calculated based on the pulse waveform and the tracking error signal.

The L1 layer will be explained. When looking at a tracking error signal of the L1 layer, in the L1 layer, a detected timing of a first tracking error signal after a pulse waveform is shifted by $X_1$ to a detected timing of the pulse waveform. In the L1 layer, $Y_1$ is equivalent to 360 degrees/ω, therefore an eccentricity angle θ1 of the L1 layer is shifted by θ1=360×($X_1/X_1$) degrees to the reference direction. Therefore, the eccentricity angle θ1 of the L1 layer to the reference direction is calculated based on the pulse waveform and the tracking error signal.

The L2 layer will be explained. When looking at a tracking error signal of the L2 layer, in the L2 layer, a detected timing of a first tracking error signal after a pulse waveform is shifted by $X_2$ to a detected timing of the pulse waveform. In the L2 layer, $Y_2$ is equivalent to 360 degrees/ω, therefore an eccentricity angle θ2 of the L2 layer is shifted by θ2=360×($X_2/X_2$) degrees to the reference direction. Therefore, the eccentricity angle θ2 of the L2 layer to the reference direction is calculated based on the pulse waveform and the tracking error signal.

Thus, by use of the multi-layer storage medium of the present invention, it is possible to identify each recording layer based on the eccentricity angle calculated from the tracking error signal and the pulse waveform. Therefore, even without performing a tracking operation of an object lens on a guide groove of each recording layer, it is possible to identify the recording layer on which spot light is currently focused, and thereby high-speed access to the recording layer is achieved.

Next, an eighth embodiment (a multi-layer data storage medium) will be explained.

Figure 9A:
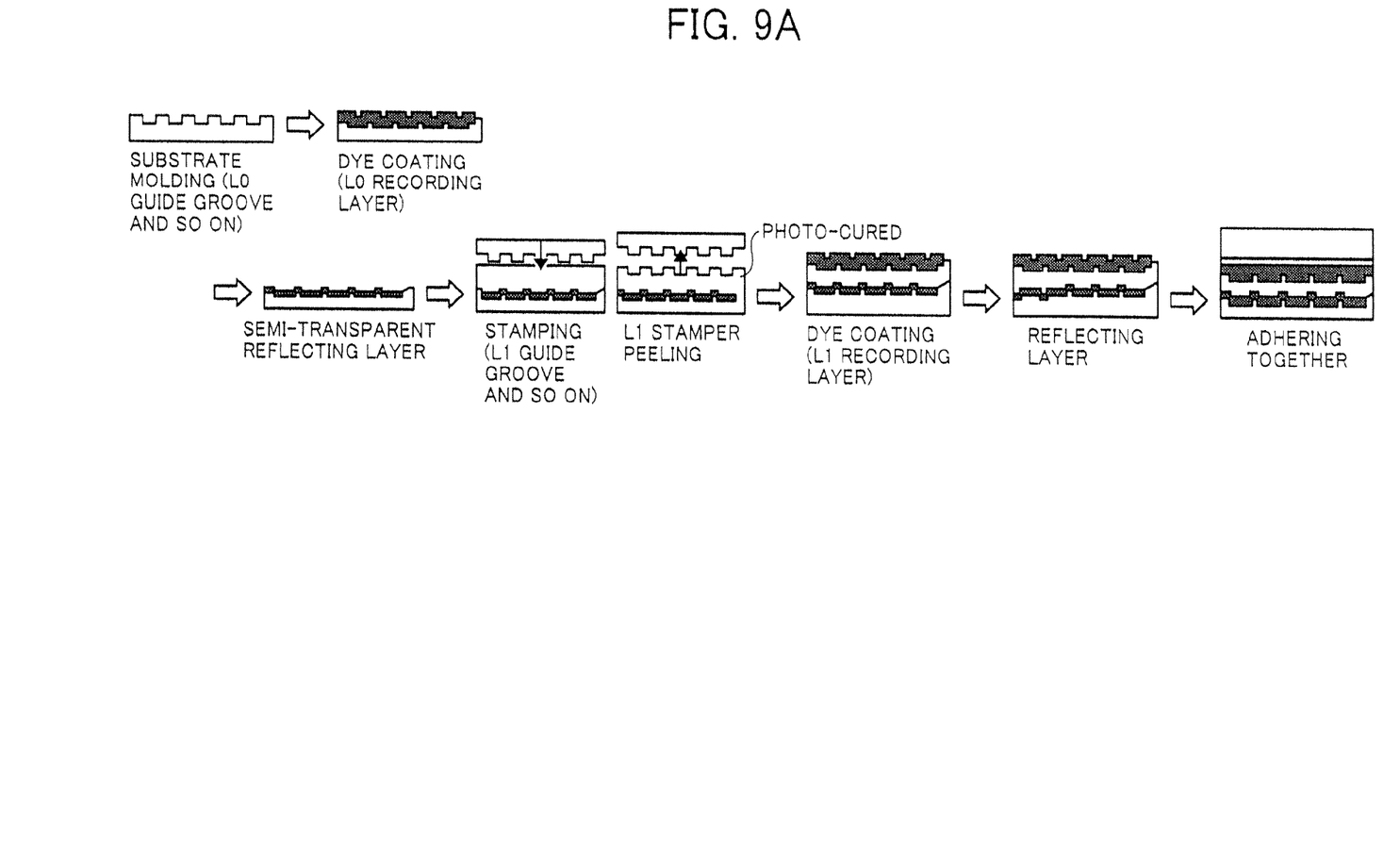
FIG. 9A is a flow chart of a 2P transfer method which explains a general production method of a multi-layer data storage medium.
Figure 9B:
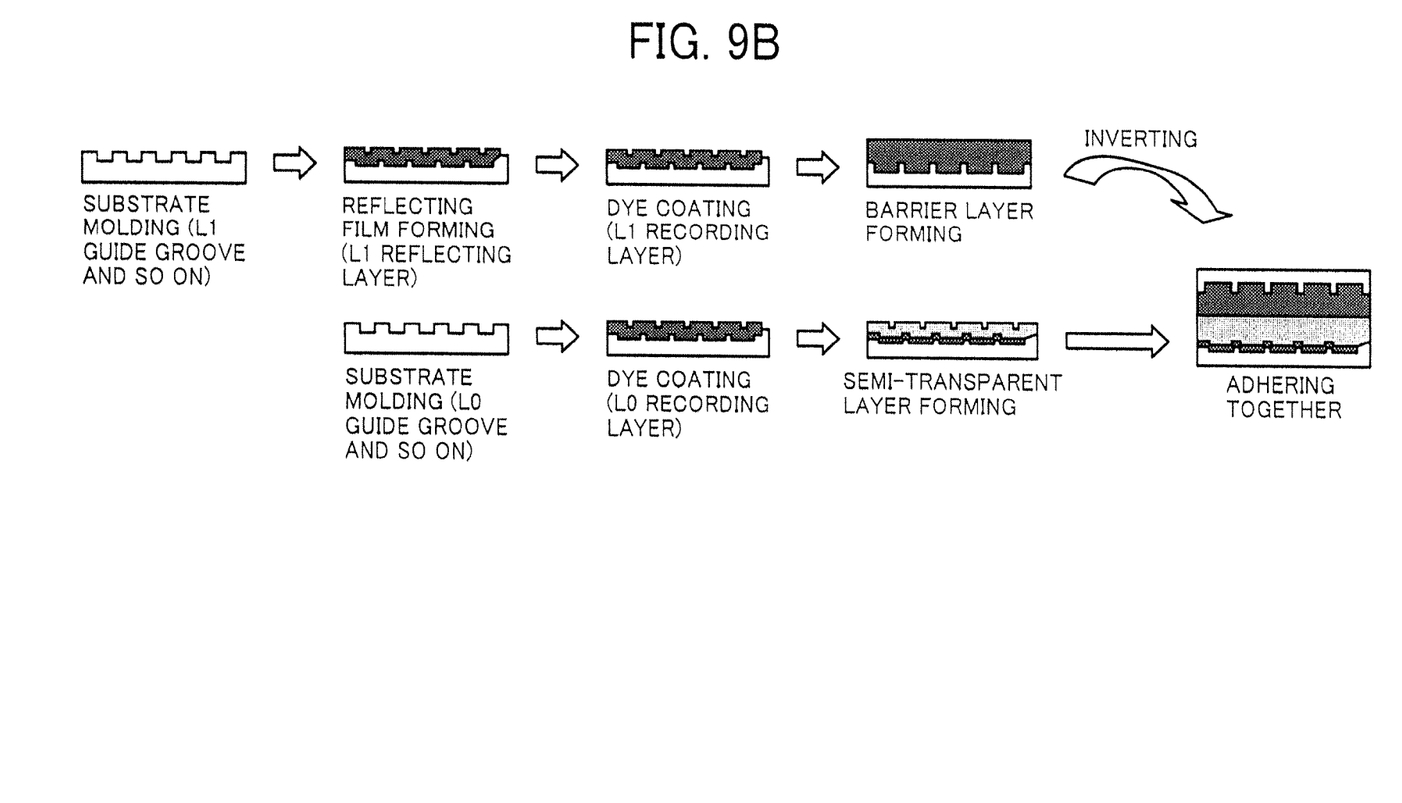
FIG. 9B is a flow chart of an inverted laminate method which explains a general production method of a multi-layer data storage medium.

FIGS. 9A and 9B explain general production methods of the multi-layer data storage medium. FIG. 9A illustrates a 2P transfer method which sequentially forms two layers on one substrate. Firstly, a guide groove and so on are molded on the substrate, and a dye is coated on the guide groove which is molded (a second stage). Next, a semi-transparent reflecting layer is provided from the dye above (a third stage), a photo-curable resin is spread by spin-coating (a fourth stage), the substrate on which the guide groove is molded is pressed from above, and the guide groove is transferred on the photo-curable resin (a fifth stage).

Then, the substrate which is pressed is peeled (a sixth stage), a dye is coated on the photo-curable resin on which the guide groove is transferred (a seventh stage) and a semi-transparent reflecting layer is again provided from the dye above (an eighth stage). Each recording layer of the multi-layer data storage medium is sequentially laminated by repeating from the fourth stage to the eighth stage.

FIG. 9B illustrates an inverted laminate method which forms two layers individually and adheres them together.

Each recording layer of the multi-layer data storage medium produced by the production method as described above is eccentric to a random direction in a few micrometers.

Figure 5:
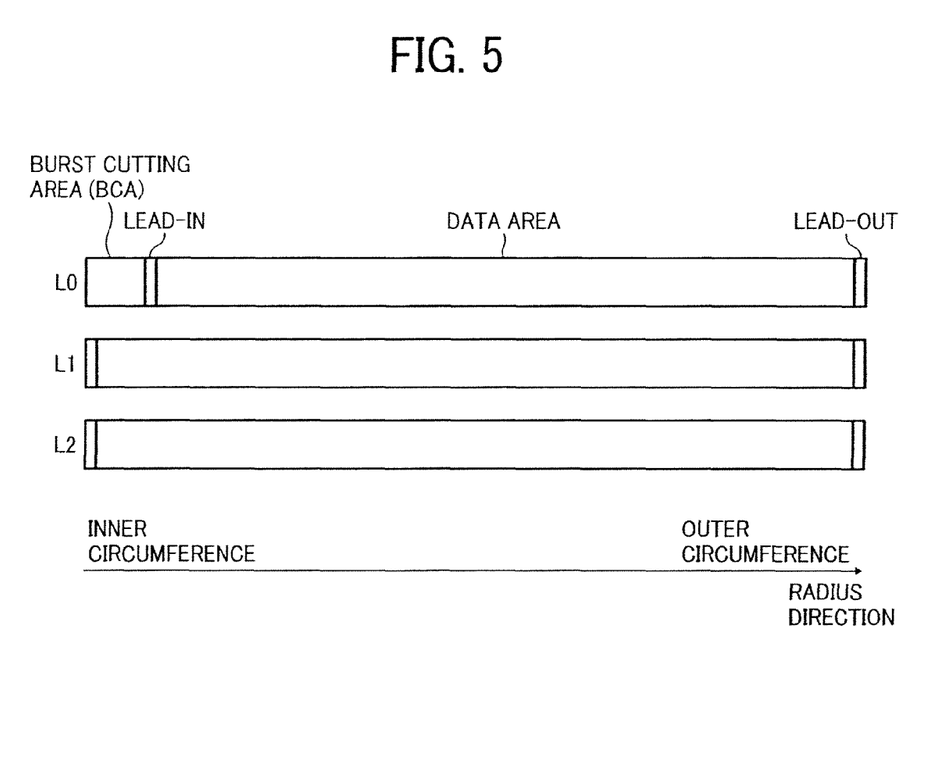
FIG. 5 is an explanatory diagram which illustrates a burst cutting area which is recorded in an arbitrary recording layer of a multi-layer data storage medium according to an eighth embodiment of the present invention.

FIG. 5 illustrates an area in order to obtain identifying information of a recording layer from each eccentricity angle.

As for this multi-layer data storage medium, a burst cutting area (BCA) is provided in the L0 layer.

An eccentricity angle of each recording layer is measured beforehand, and a measured result and identifying information of the recording layer to the eccentricity angle are recorded in this burst cutting area.

Next, a ninth embodiment (a recording layer identifying method) will be explained.

In a case where the multi-layer data storage medium illustrated in FIG. 1 is read out, firstly, identifying information of each recording layer and eccentricity angle information of each recording layer are read out from the burst cutting area.

FIG. 6 illustrates a tracking error signal (a push-pull signal) which occurs when spot light is focused on each recording layer L0, L1 and L2 of the multi-layer data storage medium of FIG. 1.

Here, for example, a timing where a tracking error signal of the L0 layer is detected is taken as $X_0$. When a spindle motor, which rotates the multi-layer data storage medium, rotates once, a tracking error signal having the same phase as the tracking error signal which is detected at the timing $X_0$ is detected again. This timing $X_0$ is taken as a reference, and when looking at the tracking error signal of the L1 layer, a timing where a first tracking error signal of the L1 layer after the timing $X_0$ inverts is shifted by $X_1$.

In the L1 layer, $Y_1$ is equivalent to 360 degrees/ω, therefore an eccentricity angle θ1 of the L1 layer to the L0 layer is shifted by θ1=360×($X_1/Y_1$) degrees. Therefore, the eccentricity angle θ1 of the L1 layer to the L0 layer is calculated by use of the timing where the tracking error signal inverts.

Likewise, when looking at the tracking error signal of the L2 layer, a timing where a first tracking error signal of the L2 layer after the timing $X_0$ inverts is shifted by $X_2$. In the L2 layer, $Y_2$ is equivalent to 360 degrees/ω, therefore an eccentricity angle θ2 of the L2 layer to the L0 layer is shifted by θ2=360×($X_2/Y_2$) degrees. Therefore, the eccentricity angle θ2 of the L2 layer to the L0 layer is calculated by use of the timing where the tracking error signal inverts.

Thus, in the multi-layer data storage medium of the present invention, it is possible to identify each recording layer based on the eccentricity angle calculated by the tracking error signal, or the tracking error signal and the pulse waveform. Therefore, even without performing a tracking operation of an object lens on a guide groove of each recording layer, it is possible to identify the recording layer on which spot light is currently focused, and thereby a high-speed access to a recording layer is achieved.

As described above, according to the present invention, each recording layer is identified by an eccentricity of each recording layer. A reference of an eccentricity is obtained, even in a case where the eccentricity of the recording layer as a reference is small. In addition, a reference of an eccentricity direction is obtained, even in a state where any recording layers are focus-controlled. In a production process of the multi-layer data storage medium of the present invention, identifying information of the recording layer is obtained without controlling an eccentricity amount.

According to the present invention, it is possible to calculate identifying information of a recording layer by use of a timing in which a tracking error signal occurs where an eccentricity direction of each recording layer is different, therefore high-speed access to the recording layer is achieved.

Additionally, in a case where each recording layer is eccentric and with a rotational symmetry centering on a center hole of the multi-layer data storage medium, compared with a medium simply having an eccentricity in the same direction, a false detection of identifying information of the recording layer is prevented, and at the same time with a minimum eccentricity amount, high-speed access to the recording layer is achieved.

Even in a multi-layer data storage medium in which an eccentricity of the recording layer as a reference is small, an eccentricity angle is calculated by use of a timing where reference direction information (pre-format information) occurs, therefore high-speed access to the recording layer is achieved.

Furthermore, even in a case where spot light is focused on any recording layer, it is possible to identify each recording layer based on the eccentricity angle calculated from the reference direction information, therefore high-speed access to the recording layer is instantly achieved.

In addition, even in a case where a multi-layer data storage medium in which the eccentricity direction of each recording layer is made randomly, a relationship of identifying information of the eccentricity angle and the recording layer is read from the burst cutting area, therefore high-speed access to the recording layer is achieved.

The recording layer is identified based on the eccentricity angle of each recording layer which is calculated based on the occurrence timing of the tracking error signal, therefore high-speed access to the recording layer is achieved.

The eccentricity angle of each recording layer is calculated based on a rotation cycle of the spindle motor, therefore high-speed access to the recording layer is achieved.

The eccentricity angle of the recording layer as identifying information is calculated based on the tracking error signal, therefore the high-speed access to the recording layer is reliably achieved.

Furthermore, by use of a relationship of the identifying information of the eccentricity angle and the recording layer which is recorded in the burst cutting area, high-speed access to the recording layer is achieved, even in the multi-layer data storage medium having any eccentricity.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A multi-layer data storage disk comprising:
a plurality of recording layers of the multi-layer data storage disk in which a guide groove, where data is stored, is formed in a spiral manner, wherein
a first recording layer of the plurality of recording layers has a center, and each center of the other of the plurality of the recording layers is eccentric to the center of the first recording layer in opposite directions from the center of the first recording layer on one axis.

2. The multi-layer data storage disk according to claim 1, wherein a figure formed by connecting each center of the plurality of the recording layers has a rotational symmetry centering on the center of the first recording layer.

3. The multi-layer data storage disk according to claim 1, wherein reference direction information is recorded along a radius direction in an arbitrary recording layer of the plurality of the recording layers.

4. The multi-layer data storage disk according to claim 1, wherein reference direction information is recorded along a radius direction in all recording layers of the plurality of the recording layers.

5. A multi-layer data storage disk comprising:
a plurality of recording layers in which a guide groove, where data is stored, is formed in a spiral manner, each of the plurality of recording layers having an eccentricity angle, wherein
a first recording layer of the plurality of recording layers has a center, and each center of the other of the plurality of recording layers is eccentric to the center of the first recording layer in opposite directions from the center of the first recording layer on one axis, each eccentricity angle of the plurality of recording layers is measured beforehand, and the measured result and identifying information of the recording layer corresponding to the eccentricity angle are recorded in a burst cutting area of an arbitrary recording layer of the plurality of the recording layers.

* * * * *